United States Patent [19]

Goyal

[11] 3,997,882
[45] Dec. 14, 1976

[54] CONTENT ADDRESSABLE MEMORY SYSTEM EMPLOYING CHARGE COUPLED DEVICE STORAGE AND DIRECTORY REGISTERS AND N/(1-H) COUNTER REFRESH SYNCHRONIZATION

[75] Inventor: Deepak K. Goyal, Princeton, N.J.

[73] Assignee: Burroughs Corporation, Detroit, Mich.

[22] Filed: Apr. 1, 1975

[21] Appl. No.: 564,140

[52] U.S. Cl. .................... 340/173 AM; 340/172.5
[51] Int. Cl.² ........................................ G11C 15/00
[58] Field of Search .... 340/173 R, 173 AM, 172.5, 340/173 RC

[56] References Cited
UNITED STATES PATENTS

| | | | |
|---|---|---|---|
| 3,733,589 | 5/1973 | Thompson | 340/173 AM |
| 3,742,460 | 6/1973 | Englund | 340/173 AM |
| 3,772,658 | 11/1973 | Sarlo | 340/173 AM |
| 3,895,360 | 7/1975 | Cricchi | 340/173 AM |
| 3,913,075 | 10/1975 | Vitaliev | 340/173 AM |

Primary Examiner—Terrell W. Fears
Attorney, Agent, or Firm—Robert J. Gaybrick; Franklin D. Ubell; Kevin R. Peterson

[57] ABSTRACT

A content addressable memory system for accessing blocks of data stored in circular charge coupled shift registers in response to a tag word presented to a directory unit comprising circular charge coupled shift registers. The memory includes clocking and logic circuitry for providing selective, high speed clocking of blocks and directory unit registers for both read and write operations. Additional logic facilitates masked directory searches at selective clock rates. Automatic synchronization of fast and slow clocked registers is provided by a counter of predetermined count corresponding to the formula N/(1-H) where H is the number of bits per circular register and H equals the ratio of slow to fast shift rates. A use bit register in the directory unit and a bookkeeping loop register in each module further aid in synchronization of the memory operation.

24 Claims, 8 Drawing Figures

CONTENT ADDRESSABLE MEMORY SYSTEM EMPLOYING CHARGE COUPLED DEVICE STORAGE AND DIRECTORY REGISTERS AND N/(1-H) COUNTER REFRESH SYNCHRONIZATION

BACKGROUND OF THE INVENTION

This invention relates to storage devices for use with data processing systems, and more particularly to a memory system providing content addressability of blocks of stored data.

Such memory systems have become increasingly important in modern data processing systems, particularly as an interface between main memory and bulk storage in the implementation of a virtual memory concept. Essentially, such a memory system provides blocks of data words which become accessible in response to an identifying tag presented to the memory system.

In the past, content addressable memory systems have generally been provided by means of mechanical access storage devices such as disk files used in conjunction with extensive software. The mechanical access devices themselves are disadvantageous because they involve moving parts, relatively large amounts of power, and relatively slow access times in comparison to the demands of modern data processing systems. Moreover, the software technique utilized involve extensive bookkeeping and problems of synchronization. They further result in undesirably slow associative search times and block transfer times.

SUMMARY OF THE INVENTION

It is therefore an object of the invention to provide an improved content addressable memory system.

It is another object of the invention to provide a content addressable memory system providing fast sorting and searching of data blocks.

It is another object of the invention to replace content addressable mechanical access storage device systems with a content addressable memory composed of charge storage elements.

It is an additional object of the invention to eliminate the extensive software involved in content addressable systems by embodying the software functions in simple hardware.

It is also an object of the invention to minimize the power requirements of a content addressable memory system employing charge coupled devices.

It is yet another object of the invention to provide a simple method of synchronizing memory systems which utilize high speed accessing and slow speed regeneration of data stored in charge coupled devices organized into circular registers.

It is still another object of the invention to provide a memory system particularly adapted as an interface between main memory and bulk storage for use in a virtual memory system.

These and other objects of the invention are accomplished by organizing a memory system comprising a number of modules, each module including a number of blocks, each block being made up of a number of continuous loop charge coupled device shift registers arranged side by side. Data words are stored in parallel in each block of shift registers, each shift register of a block containing a single bit of each data word. A shift of one bit position applied to each of the shift registers of a block thus advances each data word in parallel by one position within the block. Additional shift registers loops serve as bookkeeping loops to keep tack of the order of data in the data blocks.

Each module and each block therein is connected to a control unit which controls and synchronizes read/write operations. The control unit supplies a fast clock used in read/write operations and a slow clock used for regenerating data in non-accessed cells. The control unit further includes a 2N/(1−H) bit counter for bringing fast-clocked, accessed data blocks into synchronization with the slow-clocked non-accessed data blocks.

Cooperating with the control unit is a content addressable memory (CAM) directory unit for providing a rapid associative search of data stored within various modules and blocks. The CAM directory unit includes a plurality of charge storage shift register loops, module address loops and block address loops. According to the invention, selected tag bit loops and associated module address and block address loops may be rotated at high speed to provide a rapid associative search. Synchronization between the tag register loops shifted at high speed and those shifted at low speed is maintained by an $N_1/(1-H)$ bit counter in the CAM directory unit. Once a match between presented and stored tags is detected, the module address and block address are quickly decoded by the control unit to provide rapid read-out of data stored in the selected block. This matching technique is coordinated with the operation of a use bit register which indicates empty tag register storage positions in order to facilitate writing of tag words and corresponding data words into the memory.

BRIEF DESCRIPTION OF THE DRAWINGS

The foregoing objects and advantages of the invention as well as others obtainable by its use will be apparent from the following detailed description of the preferred embodiment of the invention when read in conjunction with the drawings of which.

DETAILED DESCRIPTION OF THE PREFERRED EMBODIMENT

Figure 1:
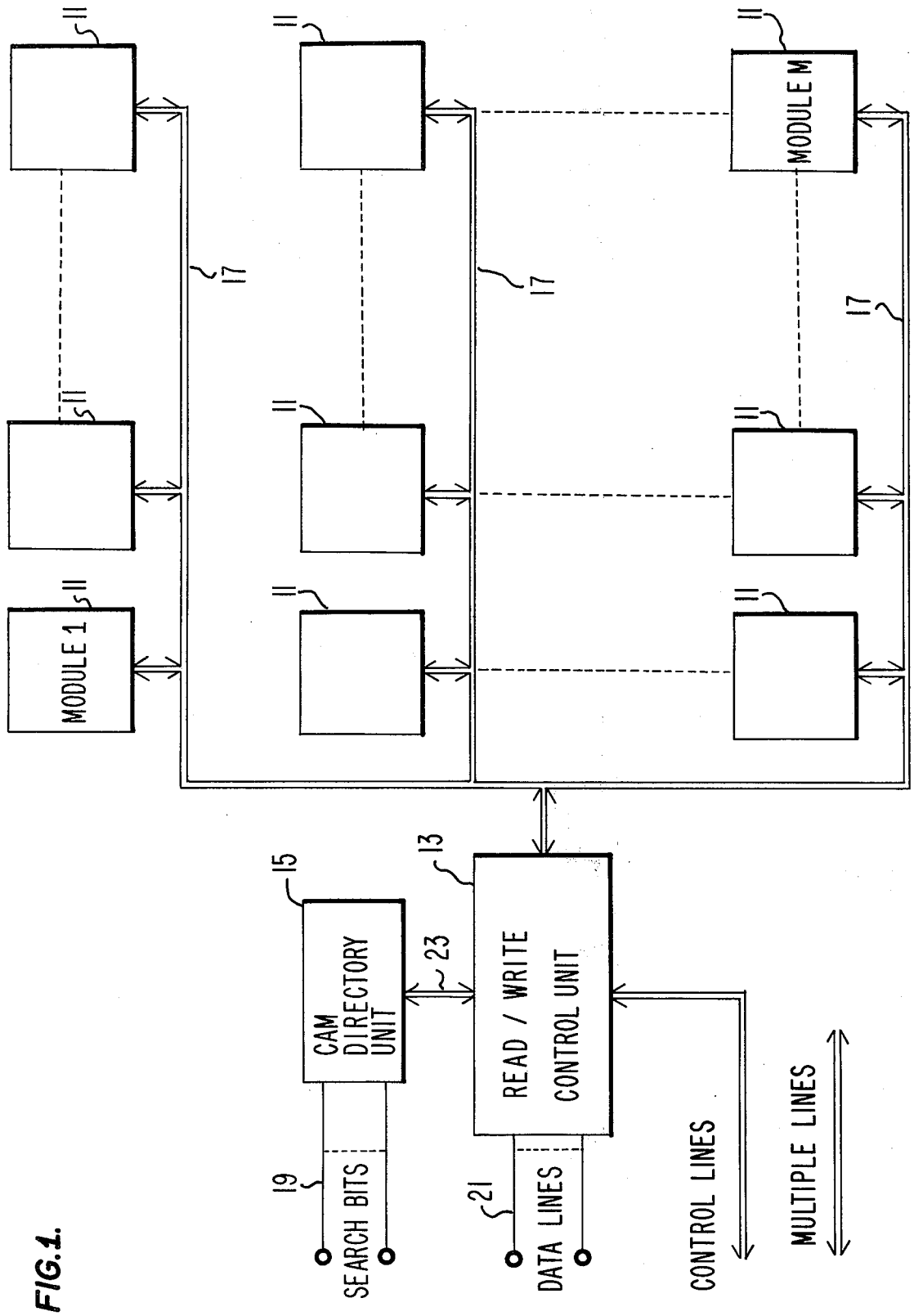
FIG. 1 is a block diagram of the system organization of the content addressable memory of the preferred embodiment of the invention.

The general system organization of the content addressable memory system of the preferred embodiment of the invention is shown in FIG. 1. The storage area comprises an array of M modules 11 connected by busses 17 to a control unit 13. The read/write control unit 13 controls input and output to the modules 11. The control unit 13 generates fast and slow clocks for clocking the data blocks 11, synchronizes these clocks and facilitates read-out and write-in of data on its data lines 21. The control unit is also connected through a buss 23 to a content addressable memory (CAM) directory unit 15. The CAM directory unit 15 responds to search bits presented to its input lines 19 by directing the control unit 13 to access and read-out data stored in a selected area in the modules 11 or write data into selected areas of the modules 11.

Figure 2:
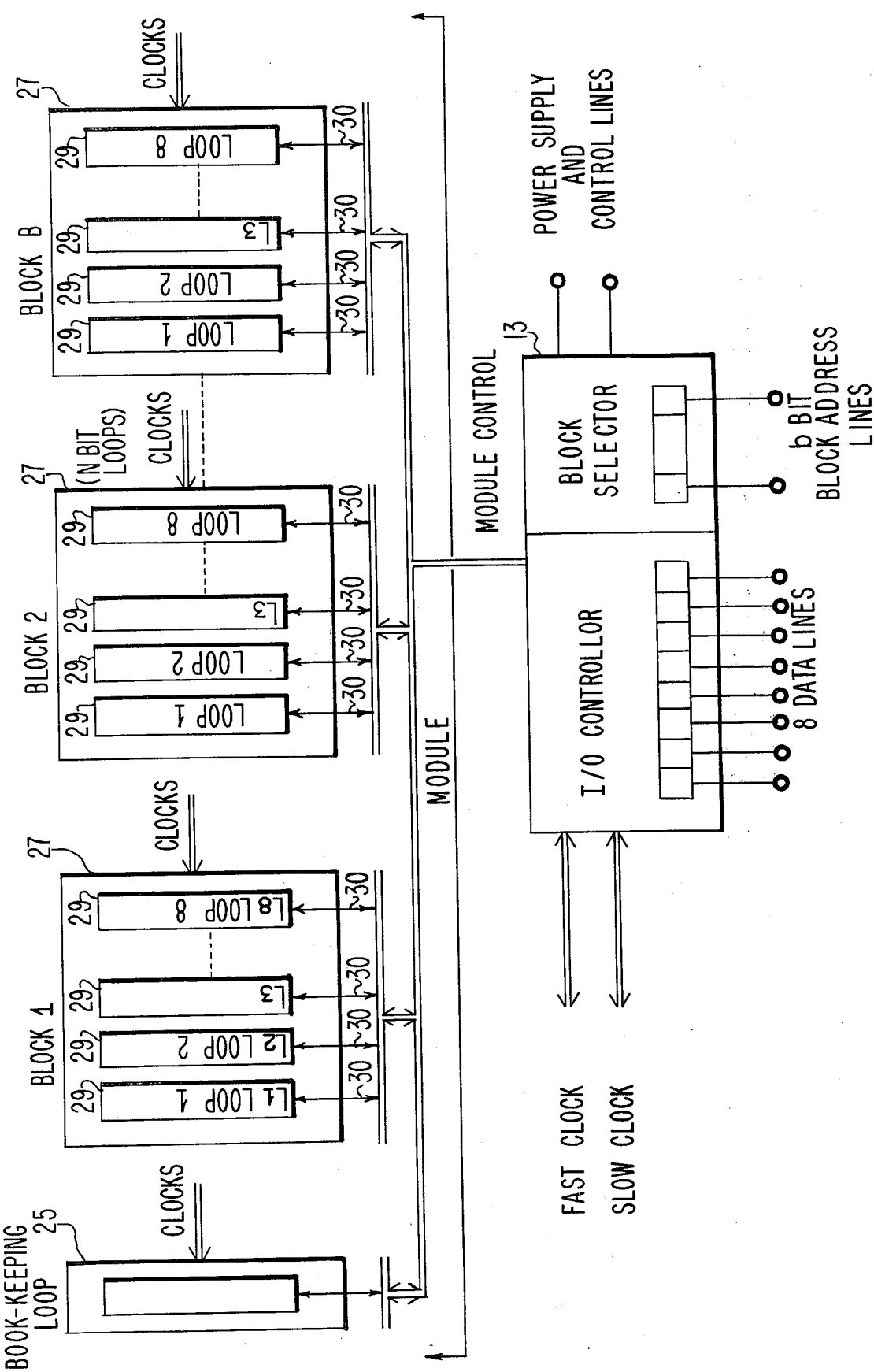
FIG. 2 is a block diagram showing the organization of a storage module of FIG. 1 and associated block structure.

The organization of a storage module 11 is more particularly shown in FIG. 2. As is illustrated, each module 11 of the preferred embodiment of the invention includes a bookkeeping loop 25 and B storage blocks 27 each consisting of 8 storage loops 29. In the preferred embodiment, each bookkeeping loop 25 and each storage loop 29 is an N-bit, charge coupled device circular shift register. The construction, organization and method of clocking a circular charge coupled shift register is well-known in the art. In particular, it is desirable to clock such a register at slow speed for data refresh and at high speed for data access in order to conserve power. According to the preferred embodiment of the invention, all of the registers in a block are clocked in synchronism with the bookkeeping loop while the various modules may operate asynchronously. Alternately, individual bookkeeping loops could be provided for each block, thus permitting individual clocking of each block as opposed to the whole module.

Data words of 8 bits are stored in parallel across the eight loops 29 of each block 27 such that one clock delivered simultaneously to each of the shift registers 29 in a block 27 shifts each word by one storage position. In other words, the first loop L1 in each block 27 stores the first bit of each data word, the second loop L2 the second bit of each data word, the third loop L3 the third bit of each data word and so forth. Thus, each 8-bit data word is accessible successively in parallel at the outputs 30 of each block 27. Lastly, the bookkeeping loop 25 performs a synchronization function as will be later detailed.

Figure 3:
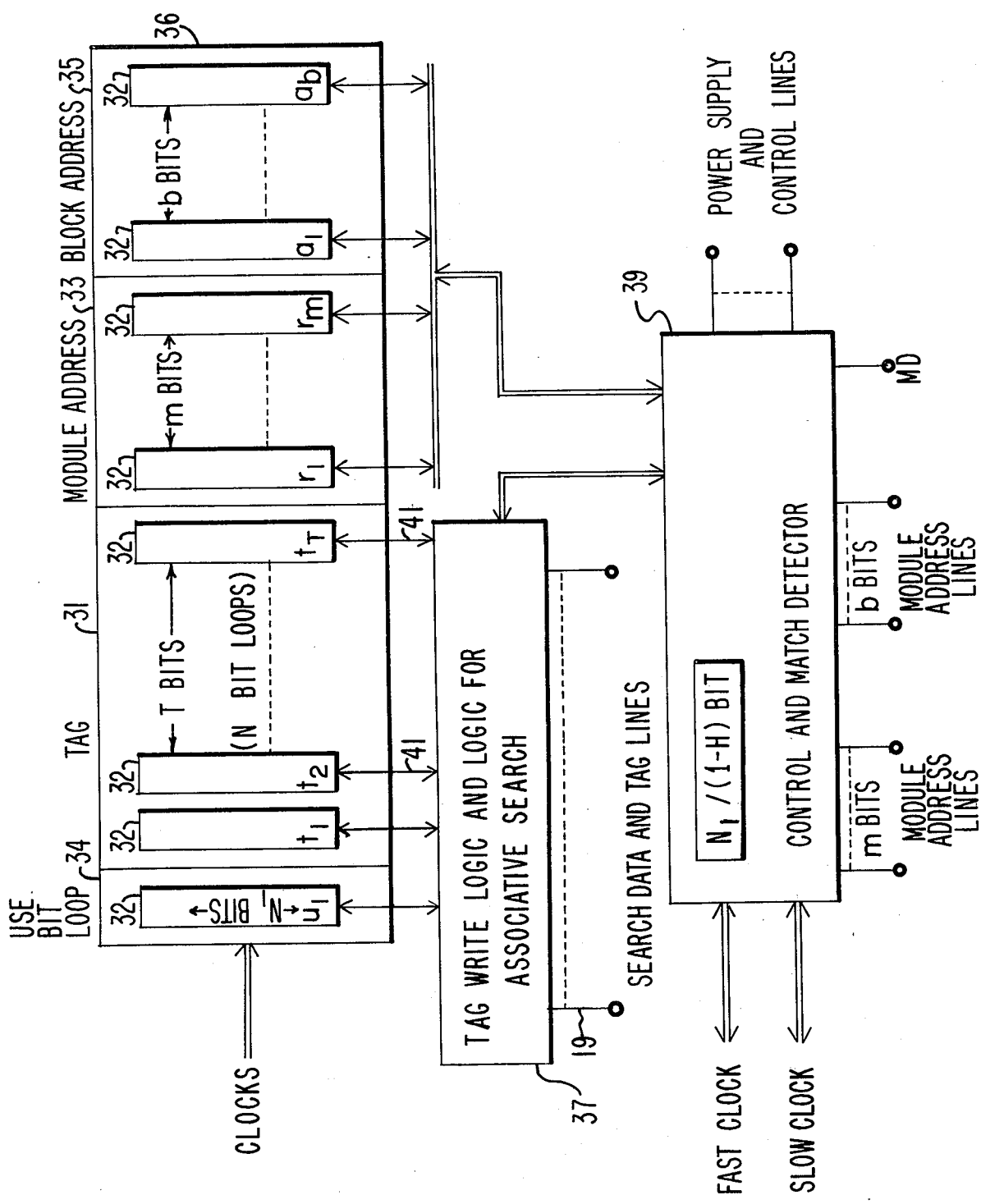
FIG. 3 is a block diagram showing the organization of the content addressable memory (CAM) directory unit of FIG. 1.

The CAM directory unit 15 is shown in more detail in FIG. 3. The directory unit 15 comprises a series of $N_1$-bit circular charge coupled device shift registers 32, which are organized into various functional blocks. The first block 31 functions as a tag register to store tag words composed of T bits. There are T circular shift registers in the tag register 31 such that each tag word is stored across T registers and may be accessed in parallel on the output lines 41. Associated with each tag word is a module address word of $m$ bits and a block address word of $b$ bits. The module address words are stored in a module address register 33 of $m$ circular charge coupled device shift registers $r_1 \ldots r_m$, while the corresponding block address words are stored in a block address register 35 of a charge coupled device circular shift registers $a_1, a_2 \ldots a_b$. Additionally, one circular charge coupled device shift register 32 functions as a use bit register 34, which stores an indication of whether a particular row in the tag word register 31 has a tag word stored therein. The following conditions must hold between the different tag register variables above:

$2^m = M, 2^b = B$
$2^T = MB, N_1 = 2^T$

The CAM directory unit also includes an associative search logic unit 37 and a control and match detector unit 39. The logic unit 37 functions in performing an associative search and writing tag words into the tag register 31, while the control and match detector unit 39 acts to control and synchronize the associative search and to provide the control unit 13 with proper match detect signals, a module address and a block address when a match is detected in the associative search logic 37.

To perform an associative search, a search data word is presented to the associative search logic 37. The use bit loop 29, module address register 33, block registers 35, and selected tag registers 31 are then rotated at high speed by a high speed clock until a tag word matching the search data word is obtained on the lines 41. The control and match detector unit 39 then detects the match and causes the module address and block address corresponding to the matching tag word to be read out and sent to the control unit 13. The control unit 13 then accesses the appropriate module 11 and block 27 as hereinafter described to read out the appropriate block of data.

At this point, the general scheme of the preferred embodiment of the invention should be apparent. A more detailed discussion of the preferred embodiment will now be entered upon, especially directed to specific structure cooperating to facilitate read-write operations and enable hardware synchronization. Such structure is particularly shown in FIGS. 4–8.

A read or write operation is initiated in the content addressable memory (CAM) directory unit 15. The function of the CAM directory unit 15 is a read-write operation may best be understood by reference to the more detailed structure of FIG. 4, more particularly illustrating the associative search logic unit 37 and the control and match detector unit 39.

The logic unit 37 includes a mask register 95, a search bits register 93, a tag bits register 90, and a number of logic gates 81, 83, 87, 85, communicating between a tag bit register 31 and a match detector AND gate 89.

These elements enable the preferred embodiment of the invention to perform a masked search on a tag word stored in the tag register 31. Initially, a desired mask pattern is placed into the mask register 95 and the desired search bits pattern is placed into the search register 93. The use bit loop 29, module address loops 33, block address loops 35 and the unmasked tag register loops in the tag register 31 are then circulated at the high speed clock rate until a match occurs between the contents of the search bits register 93 and the tag register 31.

Considering the interconnection of the logic gates of the associative search logic 37, the AND gate 81 receives an input from the first loop $t_1$ of the tag register 31 and a second input $m_1$ from the first bit of the mask register 95. The output of the AND gate 81 is connected to the input of the AND gate 83 and through an inverter 82 to the input of the AND gate 85. The AND gate 83 receives an input from the first bit $\bar{s}_1$ of the search bit register 93, while the second input of the AND gate 85 receives the inverse $s_1$ of the contents of the first bit position of the search bit register 93. The outputs of the AND gates 83 and 85 provide the inputs to an OR gate 87, which outputs into the match detector AND gate 89. Similar trains of logic are provided for each loop $t_2, \ldots t_T$ within the tag register 31.

This circuitry functions such that if loop $t_1$ is not to be masked a logical "1" appears at the input $m_1$ of the AND gate 81, and the content of the first tag register loop $t_1$ appears at the output of the AND gate 81. The AND gate 83 then detects the existence of a match between a "1" bit in the first position of the search bit register 93 and the output of loop $t_1$, while the AND gate 85 detects the existence of a match between a "0" in the first position of the search bit register 93 and a "0" appearing at the output of the first loop $t_1$. On the other hand, if it is desired to mask the first register, the AND gate 81 input $m_1$ is made a "0" bit and "0" bit is placed in the first position $S_1$ of the search bits register 93 such that the output of the OR gate 87 is a constant "1", regardless of the content of the tag bit register output loop 1. The masked registers therefore play no roll in determining the output of the mask detector AND gate 89. Thus, when a match is obtained between the unmasked bits in the search bit register 93 and the corresponding bits at the output the tag bit register 31, all of the inputs to the AND gate 89 are high, and a match detector signal MD is produced at the output of the AND gate 89.

The match detector signal MD is then sent to the control signal unit 92 and under its control, as hereafter described, a match detect address signal MDA is produced. When received by the AND gates 91, the match detect address signal MDA enables output of the module address and block address from the registers 33, 35 into the temporary module address register 97 and the temporary block address register 99 at the fast clock rate. After this read out, the fast clock rate continues for a period of time determined by a synchronizing counter in order to synchronize the tag registers rotated at high speed with those which remain subject only to the low speed clock rate. This counter is included in the counter and clock circuitry 98, shown in detail in FIG. 5. It should be noted that while selective high speed clocking of the tag register loops is employed in the preferred embodiment of the invention, the entire tag register could be rotated at the fast clock rate if desired. Of course, power consumption would then increase.

The functioning of the synchronizing counter is essential to maintaining synchronization between the fast and slow clocked tag register loops. In particular, it has been determined according to the invention that if a circular shift register containing "N" bits is rotated at a high shift rate $S_1$ while an adjacent N-bit circular shift register is rotated at a slow shift rate $S_2$, the two shift registers will come into synchronization after exactly $N/(1-H)$ shifts where H equals the ratio of the slow shift rate $S_2$ to the high shift rate $S_1$. Thus, by applying a fast clock to the unmasked tag register circular shift register loops for exactly $N/(1-H)$ shifts, data in the unmasked tag register loops may be sampled while automatically maintaining those unmasked register loops in synchronization with the masked tag register loops driven at the slow shift rate. Of course, any whole number multiple (1, 2, 3 . . . . I) of $N/(1-H)$ would also work.

Figure 5:
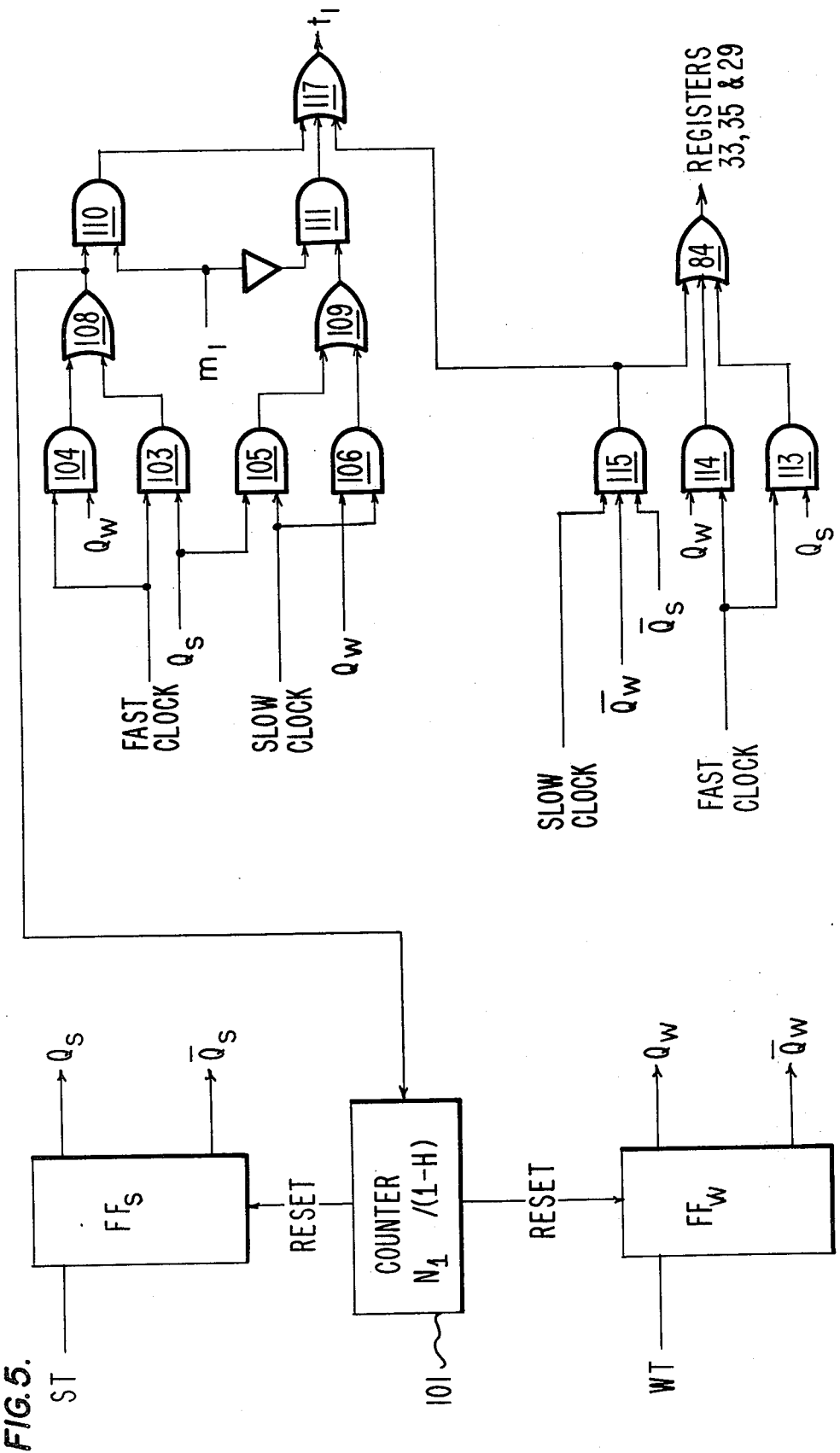
FIG. 5 is a schematic logic diagram showing clocking circuitry utilized in the CAM directory unit for selectively switching from slow to fast clocking and for synchronizing that switching.

An $N/(1-H)$ counter 101 and clock circuitry cooperating therewith for driving the circular shift registers of the CAM directory unit 15 are shown in more detail in FIG. 5. This circuitry provides the registers 33, 35, 29 with fast clocks during search and write operations and slow clocks otherwise. During either operation it provides masked tag register loops with slow clocks and unmasked tag register loops with fast clocks.

To control the clocking of the use and address registers 29, 33, 35, two flip-flops $FF_s$, $FF_w$ are used together with associated logic. The flip-flop $FF_s$ is set by a search tag signal ST when it is desired to perform an associative search and access the memory modules 11. This signal is a command supplied by the system associated with the memory of the invention. The flip-flop $FF_w$ is set by write tag signal WT produced by the circuitry of FIG. 6 hereafter described.

Figure 6:
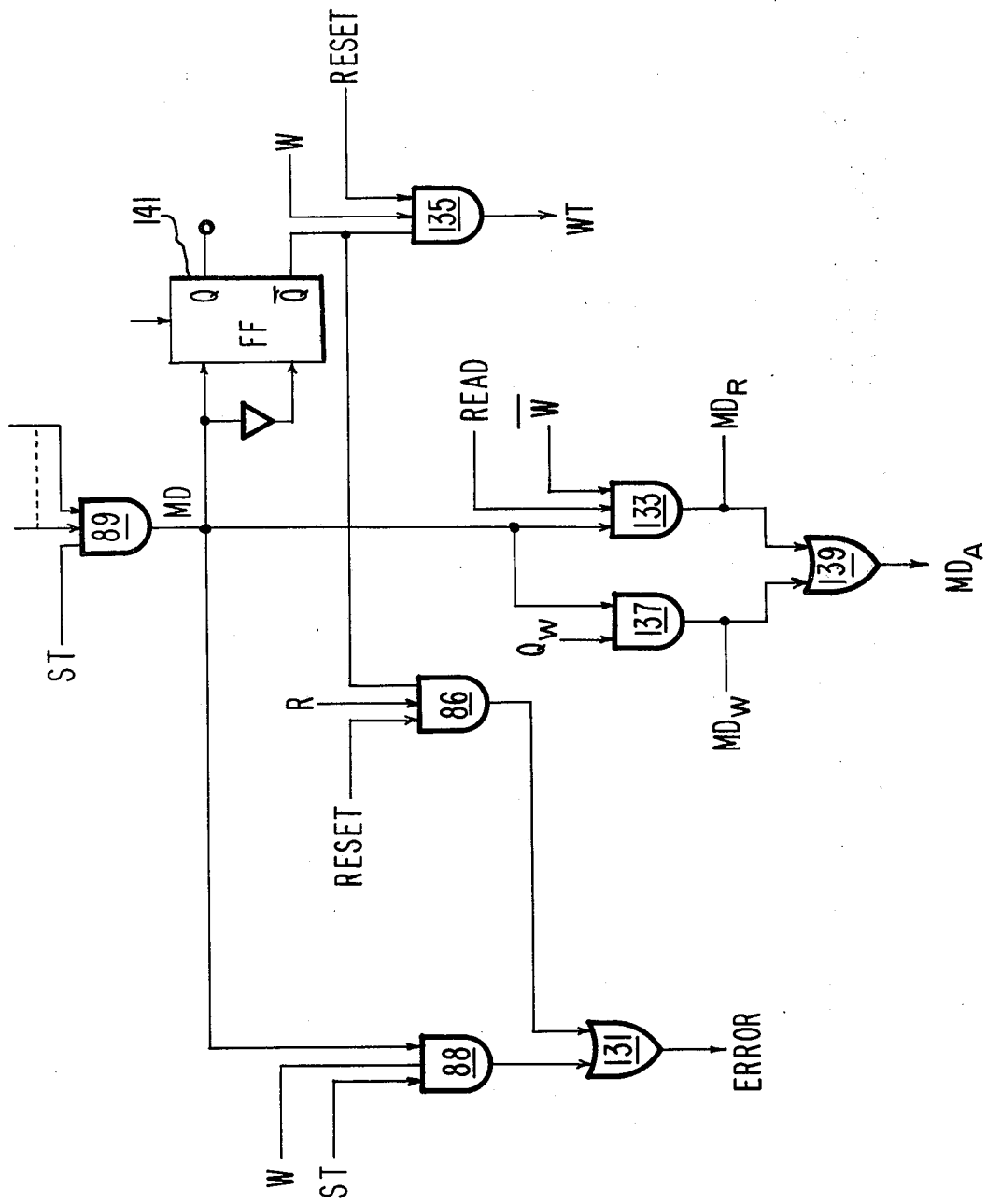
FIG. 6 is a schematic of the control signal unit of FIG. 4.

The reset outputs $\overline{Q}_s$, $\overline{Q}_w$ of both these flip-flops $FF_s$, $FF_w$ are supplied to the inputs of an AND gate 115. This AND gate 115 also receives an input from the slow clock produced by a clock generator 43 (FIG. 6). The output of this AND gate 115 is supplied as an input to an OR gate 84, whose output supplies the drive lines of the CAM directory use and address registers 29, 33, 35. Thus, when both flip-flops $FF_s$, $FF_w$ are in the reset state, these registers 29, 33, 35 are driven at the slow clock rate.

However, whenever a search or write operation is dictated and either of the flip-flops $FF_s$, $FF_w$ are consequently set, it is necessary to clock the address and use bit registers 29, 33, 35 at the fast clock rate. For this purpose, two AND gates 113, 114 each receiving a first input from the fast clock produced by the generator 43 are utilized. The first AND gate 113 receives a second input from the set output $Q_s$ of the flip-flop $FF_s$, and the second AND gate 114 receives a second input from the set output $Q_w$ of the flip-flop $FF_w$. The outputs of both these AND gates 113, 114 are connected as inputs to the OR gate 84. Thus, whenever either flip-flop $FF_s$, $FF_w$ is set, the OR gate 84 supplies the fast clock to the registers 29, 33, 35.

To provide masked or selective clocking of the CAM directory tag register loops $t_1 \ldots t_T$, the control signals supplied by the flip-flops $FF_s$, $FF_w$ are again utilized to control a series of AND and OR gates.

The first two AND gates 103, 104 are responsible for supplying a fast clock to unmasked tag register loops $t_1 \ldots t_T$ during a write or search operation. Hence, the AND gates 103, 104 are both supplied with the fast clock and respectively with inputs of the flip-flop set outputs $Q_s$, $Q_w$. The outputs of the two AND gates 103, 104 feed and OR gate 108, which inturn feeds a masking AND gate 110. This AND gate 110 receives a second input from the first bit $m_1$ of the mask register 95 (FIG. 4), and its output is supplied via the OR gate 117 to the clock lines of the first loop $t_1$ of the tag register 31. Thus, if either $Q_s$ or $Q_w$ is high and the first tag register loop $t_1$ is unmasked, that first loop $t_1$ will be clocked at the fast clock rate.

Figure 4:
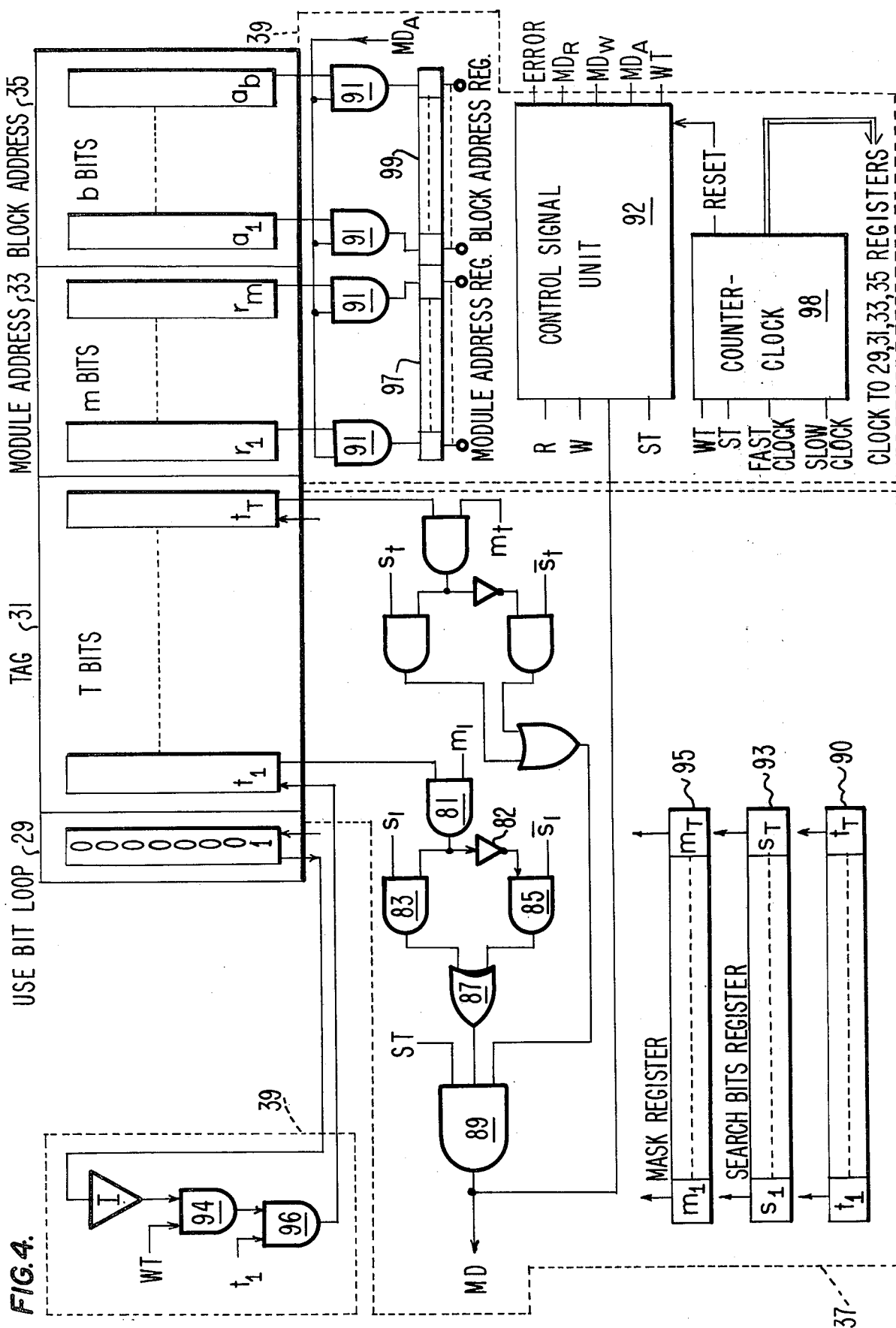
FIG. 4 is a schematic showing in more detail the logic employed in the CAM directory unit of FIG. 3.

The second series of AND gates 105, 106, direct slow clocks to the tag register loops $t1 \ldots t_T$. Each of these AND gates 105, 106 receives the slow clock as an input. Each of these AND gates 105, 106 receive a second input of one of the flip-flop set signals $Q_s$, $Q_w$ respectively. The outputs of these AND gates 105, 106 feed an OR gate 109, which inputs to a second masking AND gate 111. This masking AND gate receives the inverse $\overline{m}_1$ of the contents of the first position of the mask register 95 (FIG. 4). Thus, if a search or write tag operation is directed but the register loop $t_1$ is to be masked, it is clocked at the slow clock rate, thus conserving power. Similar pairs of masking AND gates 110, 111 and OR gates 117 may be provided to receive inputs $m_2$, $\overline{m}_2$; $m_3$, $\overline{m}_3$; . . . $m_T$, $\overline{m}_T$ to provide selective high speed clocking of all the loops of the tag register 31. Of course, it would be alternatively possible to clock all the tag register loops at high speed during search or write tag operations by eliminating the masking AND gate function.

Finally, if both flip-flops $FF_s$, $FF_w$ are in the reset state, indicating no search or writing operation is underway in the directory unit 15, both $\overline{Q}_s$ and $\overline{Q}_w$ are high. Under these circumstances, a slow clock is supplied via the AND gate 115 to the OR gate 117 for driving the tag register loop $t_1$ at the slow clock rate.

A search orwrite tag operation initiated by setting either of the flip-flops $FF_s$, $FF_w$ is terminated by the $N_1/(1-H)$ counter 101. According to the above discussion, during either operation, the address and use registers 29, 33, 35 are driven at the high clock rate. Additionally, the unmasked tag register loops are driven at the high clock rate, while the unmasked loops are driven slowly to save power. To bring these slowly clocked tag register loops into synchronization with all the other directory shift register loops clocked at high speed, the counter 101 counts the fast clock pulses delivered to these loops. For this purpose, the counter 101 may be connected to the output of the OR gate 108. After $N_1/(1-H)$ pulses, the registers have been completely circulated and are again in synchronization. At this time the counter 101 delivers reset pulses to both the flip-flops $FF_s$, $FF_w$, thereby returning control of all the directory loop clock lines to the slow clock provided by the clock generator 43.

The basic tag comparison has now been described. This operation is essential in both associative reading and writing of data into and out of the blocks in the preferred embodiment of the invention. However, additional control is required to coordinate these read/-write functions. The development of control signals necessary to control the read/write functions will first be discussed. Thereafter their application to read/write operations on the data blocks 11 will be explained.

To control reading data out of the data blocks 11 or writing data into the data blocks 11 in coordination with the detection of a match during a read operation or during the writing of a new tag into the tag register, a control signal logic unit 92 (FIG. 4) is set up at the output of the AND gate 89. Within the logic unit 92, the output of the AND gate 89 is supplied to three functionally distinct logic trains, as shown in FIG. 6.

The first logic train produces a write tag signal WT in the following manner. The output of the AND gate 89 is supplied to the set input of a match detector flip-flop 141, whose reset output $\overline{Q}$ forms an input to a write-tag AND gate 135. The write-tag AND gate 135 receives additional inputs from a write signal W and from the reset signal of the counter 101. Of course, the read signal R and write signal W are basic control signals produced by cooperating circuitry external to the invention. Thus, if no match has been detected such that flip-flop 141 is in the reset state and a write signal W is applied,, and a reset pulse is supplied by the counter 101, a write tag pulse WT is produced.

The second logic train produces match detect signals $MD_W$ and $MD_R$. This train includes a match detect read AND gate 133 and a match detect write AND gate 137, which both receive inputs from the output of the match detect AND gate 89. The match detect read AND gate 133 additionally receives the read signal R and the inverse of the write signal W, while the match detect write AND gate 137 receives an additional input from the output $Q_W$ of the flip-flop $FF_W$ shown in FIG. 5. The match detect read and write signals, $MD_R$ and $MD_W$, are supplied to a match detect OR gate 139 which produces a match detect address signal $MD_A$.

Figure 7:
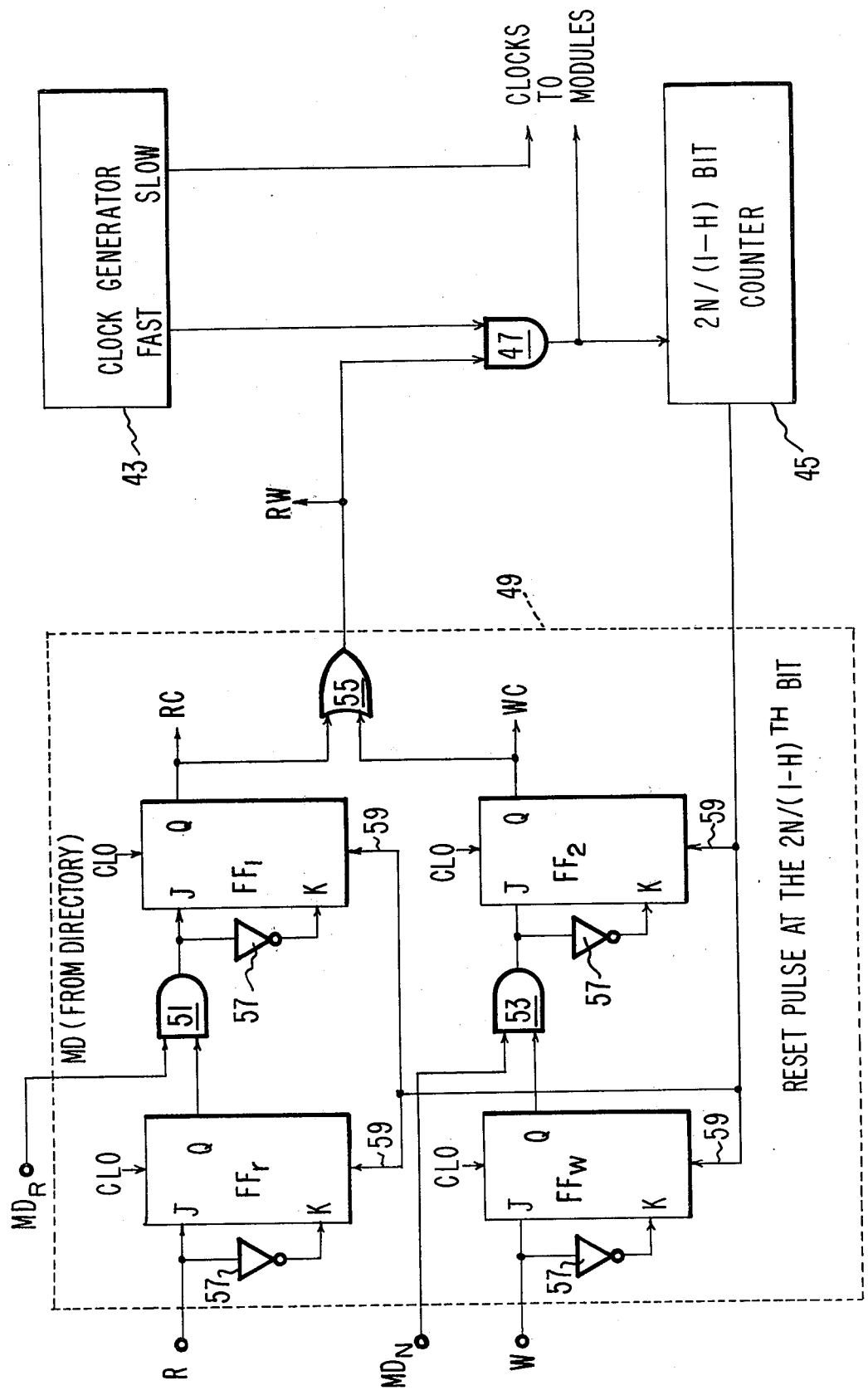
FIG. 7 is a schematic of logic used in the read/write control unit for controlling read/write operations.

Thus, when a read operation is to be performed and a match is detected by the match detect AND gate 89, a match detect read signal $MD_R$ and a match detect address signal $MD_A$ are produced for respectively enabling the AND gates 91 of FIG. 4 and the flip-flop $FF_1$ of FIG. 7.

When a write operation is to be performed, the output $Q_W$ of the flip-flop $FF_W$ (FIG. 5) is supplied to the match detect write AND gate 137 after a search operation has resulted in production of a write-tag signal WT. Thus, upon writing of a tag into the tag register 31, as hereafter detailed, the match detect AND gate 89 enables the match detect write AND gate 137 to produce the $MD_A$ and $MD_W$ signals for respectively enabling the AND gates 91 and the flip-flop $FF_2$ of FIG. 7.

The third train of logic depending from the match detect AND gate 89 detects erroneous operations in the system. This logic includes a first error AND gate 86 and a second error AND gate 88, both of which output to an error OR gate 131. The first error AND gate 88 receives inputs from the match detect AND 89, the write signal W, and the search tag signal ST. Thus, this AND gate will produce an error signal via the error OR gate 131 if a tag matching that desired to be inputted is detected during the search tag operation hereafter described. The second error AND gate 86 receives inputs from the reset output $\overline{Q}$ of the match detect flip-flop 141, from the read signal R and from the reset line of the counter 101. This AND gate 86 will produce an error signal via the error OR gate 131 if a read operation is instituted and a match is not detected after $N_1/(1-H)$ clock pulses have been delivered to clock the tag registers 31.

The signal WT produced by the second signal train described above operates in controlling a write operation. In such an operation, two basic functions must be accomplished: (1) an identifying tag must be entered into the tag register 31; (2) the corresponding data must be entered into the block identified by the address corresponding to the new tag. In the following discussion, the writing in of a tag and production of corresponding block and module addresses will be described. Then the manner of directing data into the proper corresponding block will be detailed. In writing a tag into the tag register 31, additional control circuitry shown in FIG. 4 is necessary.

As shown in FIG. 4, a write AND gate 96 has its first input connected to the output of an AND gate 94 and its second input connected to the first bit position $t_1$ of an intermediate tag bit register 90. This register 90 stores the bits of a tag word to be entered into the tag register 31 through a series of write AND gates identical to AND gate 96. The AND gate 94 has its first input connected to the inverted output of the use bit register 29 and its second input connected to receive the write tag signal WT.

If it is desired to write a word block into memory, a write signal W is produced and a tag word is stored in the intermediate tag register 90 and the search register 93. If desired, a masked write operation could be provided by circuits similar to that used for a masked read operation. Such circuitry is not further detailed here. A search tag signal ST is then supplied to the AND gate 88 (FIG. 6( and to the flip-flop $FF_s$ (FIG. 5). The fast clock is then gated via the AND gate (FIG. 5) to the CAM directory unit 15 to rotate all the registers therein at high speed and perform a comparison operation. If the tag word in the register 90 is already in use in the tag register 31, an error will be indicated by a control signal error outputted from the error OR gate 131.

The other control signals WT, $MD_A$, $MD_R$, $MD_W$ will be inhibited during the first $N_1/(1-H)$ high speed clock pulses of the search operation because the "not write" signal $\overline{W}$ delivered to the match detect read AND gate 133 is low, and no reset pulse is supplied to the AND gate 135, keeping WT and hence $Q_W$ low.

If no match between the new tag in the intermediate register 90 and a previously stored tag has been detected during the search operation, the output $\overline{Q}$ of the match detect flip-flop 141 is high and a write signal W is present. After the registers have been circulated by $N_1(1-H)$ clock pulses during the search tag operation, a reset pulse is supplied by the counter 101. Under these conditions, a write-tag pulse WT is produced by the write-tag AND gate 135. This pulse then sets the write tag flip-flop $FF_W$ of FIG. 5, producing an output $Q_W$ from it. Simultaneously, the high speed clock is gated to all unmasked directory unit registers by the the AND gate 80 (FIG. 5). The registers of the CAM directory unit 15 are then rotated at high speed until a "0" use bit is detected at which time the AND gate 94 is enabled. In turn, the write AND gates 96 are enabled by the output of the AND gate 94, causing the tag word to be read from the intermediate tag input register 90 into the selected empty storage position in the circulating tag register 31. Since there is now a match between the contents of the search bits register 93 and the contents at the output of the tag register 31 and since $Q_w$ has been produced by the write tag signal WT, a match detect write signal $MD_W$ and a match detect address signal $MD_A$ are respectively produced by the AND gate 137 and the OR gate 139. In response, the module address and block address corresponding to the inputted tag word are read out. The control unit 13 then decodes these addresses as hereinafter described to permit data to be written into the module and block represented by the module and block addresses. A standard decoder 138 (FIG. 8) may be used for decoding the addresses in either the read or write modes.

As has been indicated, the CAM directory unit 15 directs the control unit 13 in performing read and write operations into the various data blocks 27. The control unit circuitry responds to the match detect signals $MD_R$, $MD_W$ and the block and module addresses produces by the CAM directory unit by accessing the particular address indicated and by clocking the accessed block at high speed in order to rapidly remove or enter data while concurrently synchronizing data blocks subjected to fast and slow rates. The particular control unit apparatus for accomplishing these read-write control operations will now be described with reference to FIG. 7 and FIG. 8.

The fast and slow clock rates are provided by a clock generator 43 shown in FIG. 7. The slow clock is bussed directly to the modules 11, while the fast clock is outputted to the first input of an AND gate 47. The second input of the AND gate 47 is driven by a read-write signal RW supplied by the read-write control circuitry 49. The output of the AND gate 47 is sent to the modules 11 and also to a counter 45.

The read-write control circuitry 49 includes two AND gates 51, 53 and four JK flip-flops $FF_r$, $FF_w$, $FF_1$, $FF_2$, having their J inputs inverted by inverters 57 and applied to their respective K inputs. The read flip-flop $FF_r$ receives an input from a read signal R at its J input and has its Q output connected to the first input of an AND gate 51, which receives the match detect read signal $MD_R$ from the AND gate 133 (FIG. 4) of the CAM directory unit 15. The output of the AND gate 51 is inputted to the J input of the first read control flip-flop $FF_1$, whose Q output supplies a read control signal RC to the data access controls (FIG. 8) and to an OR gate 55. Similarly, the write flip-flop $FF_w$ receives an input from a write signal W, and has its Q output connected to an AND gate 53. The AND gate 53 receives the match detect write signal $MD_w$ as a second input and has its output connected to the J input of the second control flip-flop $FF_2$. The output Q of the write control flip-flop $FF_2$ supplies a write control signal WC to the data block access controls (FIG. 8) and also to the OR gate 55.

Thus, when a read or write operation is directed by the associated data processing system a read or write pulse R, W is stored in the respective read or write flip-flops $FF_r$, $FF_w$. When a successful match occurs in the CAM directory unit, the read or write pulse stored in the flip-flops $FF_r$, $FF_w$ is transferred to the first or second control flip-flops $FF_1$, $FF_2$, respectively.. Transfer of a read bit to the first control flip-flop $FF_1$ produces a read control signal RC and an output RW from the OR gate 55. Similarly, transfer of a write bit into the second flip-flop $FF_2$ produces a write control signal WC and an output RW from the OR gate 55. At the end of a read or write operation, the four flip-flops $FF_r$, $FF_1$, $FF_w$, $FF_2$ are reset by the counter 45 through reset lines 59.

The functioning of the counter 45 is essential to maintaining synchronization of accessed data blocks with non-accessed data blocks. As before noted, it has been determined that if a circular shift register containing N bits is rotated at a high shift rate $S_1$ while an adjacent N-bit circular shift register is rotated at a low shift rate $S_2$, the two shift registers will come into synchronization after a whole number multiple of $N/(1-H)$ shifts where H equals the ratio of the low shift rate $S_2$ to the high shift rate $S_1$. Because of the functioning of the bookkeeping loop 25, as hereafter described, the counter in the preferred embodiment resets after $2N/(1-H)$ shifts.

Figure 8:
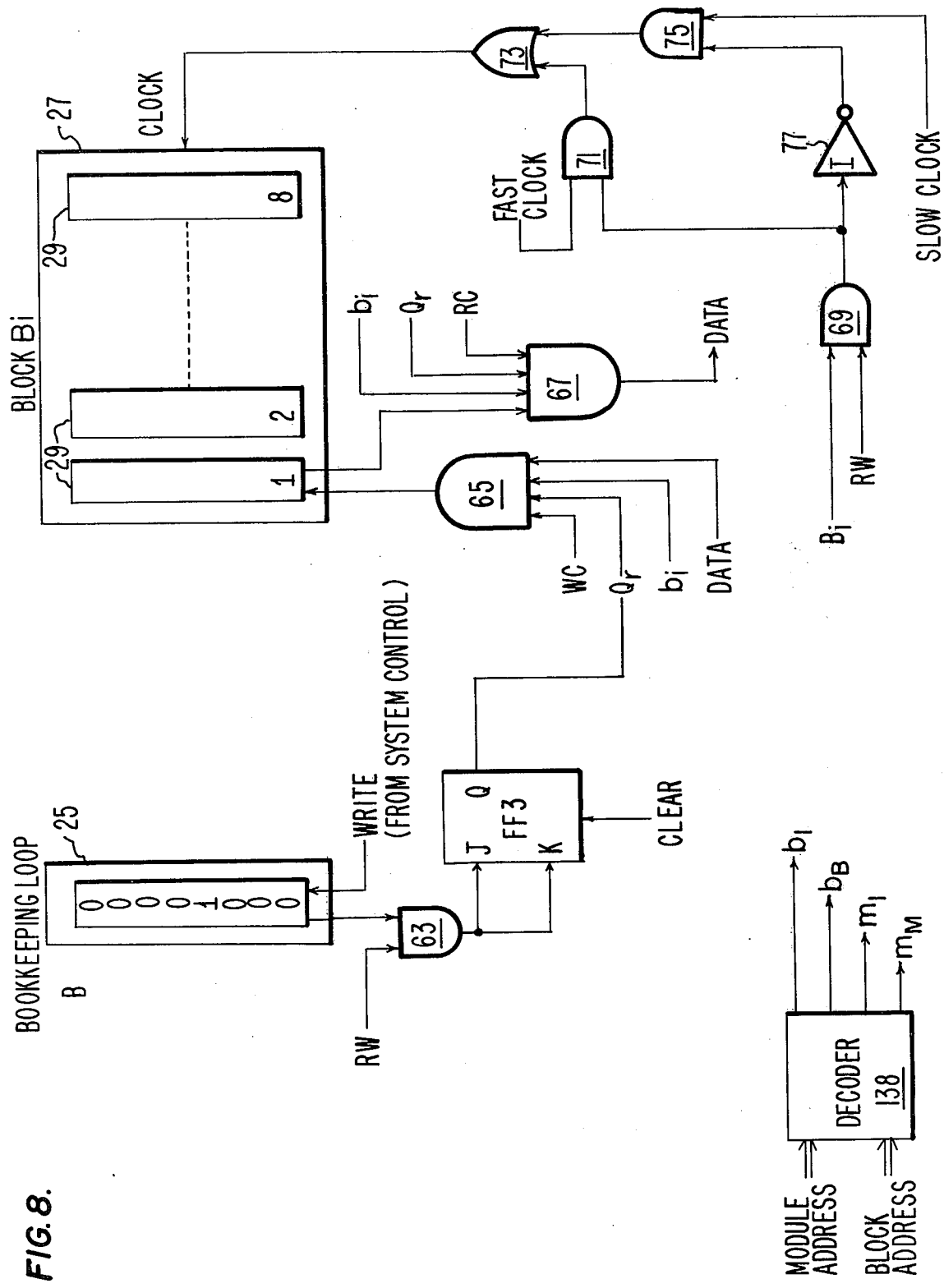
FIG. 8 is a schematic of additional logic used in the control unit for controlling read/write operations.

The particular control logic for controlling input and output to the storage blocks 27 in response to the high speed clock drive is shown in FIG. 8. When the control unit 13 receives a particular module address and an associated block address from the CAM directory unit 15, it decodes them into a module enable signal and a block enable signal. Access lines are then closed between the input-output lines of the memory and the selected module and the selected block therein. FIG. 8 illustrates a particular block $B_i$ in a module $M_i$ which has been accessed by a module enable signal $m_i$ and a block enable signal $b_i$. As indicated in the preceding discussion, the system control circuitry of FIG. 7 provides read-write signals RW, RC and WC in response to a write or read instruction and match detect read or write signals $MD_A$, $MD_w$. The circuitry of FIG. 7 also provides fast and slow clock signals as previously discussed.

The gating circuit for controlling the clock rate of the shift registers 29 in loops 1–8 of the block $B_i$ comprises three AND gates 69, 71, 75, an OR gate 73 and an inverter 77. The AND gate 69 receives inputs from a block enable signal $b_i$ and the read-write signal RW such that its output goes high when the block $B_i$ has been selected and a read or write instruction has been received. The fast clock signal from the clock generator 43 is then gate through the AND gate 71 and OR gate 73 to the clock lines of the shift registers 29 in the block $B_i$. At the same time, the high output signal of the AND gate 69 is inverted by inverter 77 so as to inhibit the slow clock by means of the AND gate 75. As is apparent, if the block $B_i$ has not been selected, the signal provided by the inverter 77 will be positive such that the slow clock will be gated through to clock the circulating shift registers 29.

Even though fast clock signals are being supplied to the block $B_1$, immediate read out of data may not occur because of the operation of the bookkeeping loop 25. The bookkeeping loop 25 stores a single "one-bit" and a string of "zero bits". The output of the bookkeeping loop 25 is connected to the input of an AND gate 63, which receives a second input from the read-write signal RW. The output of the AND gate 63 is connected to a JK flip-flop $FF_3$, which operates in the toggle mode. The output of the flip-flop $FF_3$ is fed to one input of a write AND gate 65 and one input of a read AND gate 67. The write AND gate 65 receives the write control signal WC from the read/write control circuitry 49 of FIG. 7, another input from the block enable signal $b_i$ and a final input from a data line. The output of the write AND gate 65 is connected to enter data into the first loop 1 of the block $B_i$. The readout AND gate 67 receives additional inputs from the blocks enable signal $b_i$, the read control signal RC generated by the read/write control circuitry 49 and the output of the circular shift register loop 1. Identical AND gates 65, 67 are provided for accessing each of the other loops 2 through 8 in the block $B_i$ and in the other blocks of the system.

Thus, when a read or write operation on the block $B_i$ is dictated, the high speed clock circulates the data in the circulating shift registers of the block $B_i$ and the bookkeeping loop 25 until detection of a "1" at the output of the bookkeeping loop 25 enables the read AND gate 67 or the write AND gate 65. Data may then be written into or read out of the block $B_i$ in parallel in response to proper block enable signals, data signals and read or write control signals. As before noted, in order to allow the bookkeeping loop to properly function, the counter 45 counts $2N/(1-H)$ fast pulses before resetting the flip-flops $FF_R$, $FF_w$. When this reset occurs, the bits of words stored across the circular shift registers of the data blocks are again aligned in parallel.

At this point the function and operation of circuitry for performing read and write operations in a memory configured according to the invention has been described. Some possible modifications well within the power of one of ordinary skill in the art enabled by this disclosure have been noted. Many others are possible. Therefore it is to be understood that, within the scope of the appended claims, the invention may be practiced other than as specifically described above.

What is claimed is:
1. A content addressable memory system for accessing data in response to an inputted tag word and read, write and search tag signals comprising:
 a plurality of memory modules, each said module containing a plurality of blocks of data storage means;
 a plurality of closed loop charge storage shift register means for storing in succession and accessing in succession in response to a said search tag signal a plurality of directory words, each said directory word comprising a plurality of bit positions said bit positions grouped to form a tag syllable, a module address and a block address, each said shift register means being arranged to shift circularly and in parallel with the other said shift registers, each said register storing a particular bit position of each of said directory words;
 means for clocking said shift registers,
 input-output means at a parallel bit storage position of each of said shift registers for enabling accessing each of said directory words in parallel as said directory words are successively shifted to said parallel bit storage position in response to clocking of said shift registers by said clock means;
 means for comparing each said tag word syllable to said inputted tag word when said tag syllable is presented at said parallel bit storage position and for detecting a match between a said tag word syllable and said inputted tag word;
 means for outputting from said input-output means the block address and module address of a directory word containing said matching tag word syllable; and
 control means receiving said outputted module address and block address for accessing the particular block represented by said outputted module address and said outputted block address.

2. The content addressable memory of claim 1 wherein said clocking means comprises:
 gated clock means for clocking said shift registers with high speed clock pulses in response to a said search tag signal and with slow speed clock pulses when said directory words are not being successively accessed.

3. The content addressable memory system of claim 2 wherein said comparing means comprises:
 register means for storing said inputted tag word; and
 logic means for comparing each bit of said inputted tag word to the corresponding bit of each said tag word syllable accessed at the input-output means of each tag word syllable bit storing shift register during said successive accessing of said directory words at said input-output means.

4. The content addressable memory system of claim 3 further including: means for selectively masking said tag word syllable bits; and wherein said clocking means includes:
 means for substituting clock pulses at said slow speed for the said high speed clocl pulses delivered to those said shift registers storing tag word syllable bits which are masked by said masking means.

5. The content addressable memory system of claim 4 further including:
 means for automatically synchronizing the high speed clocked shift registers storing unmasked tag word syllable bits with the slow speed clocked shift registers storing masked tag word syllable bits.

6. The content addressable memory system of claim 5 wherein said synchronizing means comprises:
 means for counting said high speed clock pulses and disabling delivery of said high speed clock pulses and substituting said slow speed clock pulses therefor upon the count reaching a whole number multiple of $N/(1-H)$ where N is the number of bits in a said tag word syllable bit storing shift register and H = the ratio of the slow speed clock rate to the high speed clock rate.

7. The content addressable memory system of claim 3 further including:
means responsive to said search tag and write signals for writing a said inputted tag word from said register means into the said shift registers storing said tag word syllable bits and wherein said accessing means includes means for writing corresponding data into the particular block represented by the said block address and said module address corresponding to said written-in inputted tag word.

8. The content addressable memory system of claim 7 wherein said inputted tag word writing means includes:
use bit register means for indicating the absence of a tag word syllable in a particular directory word;
means for generating an error signal and inhibiting said outputting of said module and block address if a said match is detected by said logic means between a tag word to be written into said tag word storing shift registers and a tag word syllable already stored in said registers;
means for generating a write tag signal if no said error signal is generated;
means responsive to said write tag signal for clocking said directory word storing shift registers with high speed clock pulses; and
means for transferring said inputted tag word from said storing means through said input-output means amd into said shift registers storing said tag word syllable bits only when said use bit register means indicates the absence of a said tag word syllable.

9. The addressable memory system of claim 1 wherein said blocks comprise;
a plurality of memory block closed loop charge storage shift registers of equal bit length for storing successively ordered data words in rotatable storage positions, each said memory block register being arranged to shift circularly and in parallel with the remaining memory block shift registers each said memory block shift register storing a particular bit position of each successive data word;
means for clocking said memory block shift registers;
input-output means at a parallel storage position of each said memory block shift registers for enabling access in parallel to each storage position presented at said parallel storage positions by actuation of said clocking means.

10. The content addressable memory system of claim 9 wherein said control means comprises:
means for decoding said outputted block and module addresses to produce a module control signal and a block control signal, said module control signal and block control signal indicating a selected block;
means for detecting when the first said storage position in said selected block is present at said input-output means;
means cooperating with said input-output means for reading data out of said selected block upon coincidence of detection of said first position and a said read signal;
means for writing data into said selected block upon coincidence of said detection of said first position and a said write signal; and
wherein said means for clocking said second shift registers includes means responsive to a said read signal or a said write signal and a said module control signal and a said block control signal for clocking the said shift registers of said selected block at high speed with fast control clock pulses while clocking the said shift registers of unselected blocks at slow speed with slow control clock pulses.

11. The content addressable memory system of claim 10 wherein said control means further includes:
means for synchronizing the said shift registers of said selected and unselected blocks after application of respective fast and slow control clocks thereto by said clocking means.

12. The content addressable memory system of claim 11 wherein said synchronizing means comprises:
means for counting said fast control clock pulses and disabling said high speed clocking of said selected block registers and substituting said slow speed clocking therefor upon the counting of any whole number multiple greater than one (2, 3, 4 ... I) of $N/(1-H)$ said fast control clock pulses where N equals the number of bits in each said second shift register and H equals the ratio of the slow to fast clock rates.

13. A content addressable memory providing access of blocks of data in response to identifying tag words comprising:
a plurality of modules each including a plurality of $N_1$-bit shift registers organized into data storage blocks;
a plurality of $N_2$-bit charge storage circular shift registers for storing in succession and presenting in succession at an access location at a high speed clock rate a plurality of directory words including a use syllable, a tag word syllable, a module address and a block address;
means for performing a search on said tag syllables presented at said location and outputting a first module and a first block address upon a match between a said identifying tag word and a tag syllable corresponding to a first module address and a first block address;
means for accessing at a second high clock rate the specific block indicated by said first module address and said first block address while other blocks are clocked at a second slower clock rate; and
means for synchronizing said specific block clocked at said high rate with those clocked at said slower clock rate.

14. The content addressable memory of claim 13 wherein said search performing means includes:
means for selectively masking the bit positions of a tag syllable presented at said access location by said shift registers;
means for clocking registers which are selectively masked at slow speed rate while clocking registers which are left unmasked at said high speed clock rate; and
means including an $I_2N_2/(1-H)$ bit counter for synchronizing said slow and fast speed clocked registers where H equals the ratio of said slow speed rate to said high speed clock rate and $I_2$ is any whole number $(1, 2, 3 \ldots I_2)$.

15. The content addressable memory of claim 14 wherein said said specific block synchronizing means includes an $I_1N_1/(1-H)$ bit counter where H equals the ratio of the said second slower clock rate to said second high clock rate and $I_1$ is any whole number $(1, 2, 3, \ldots I_1)$.

16. A method of synchronizing shift registers storing N bits clocked by first clock pulses at a first clock rate with shift registers storing N bits clocked by second clock pulses at a second faster clock rate comprising the steps of:
  counting the said second clock pulses;
  inhibiting the supply of said second clock pulses to said shift registers clocked at said second rate and substituting said first clock pulses therefor upon counting of N/(1-H) said second clock pulses or a whole number multiple thereof where H equals the ratio of said first clock rate to said second faster clock rate.

17. A method of synchronizing shift registers storing N bits clocked by first clock pulses at a first clock rate with shift registers storing N bits clocked by second clock pulses at a second faster clock rate comprising the steps of:
  counting the fast clock pulses delivered to said unmasked shift registers; and
  inhibiting the supply of fast clock pulses to said unmasked registers and substituting said pulses of lower frequency therefor upon counting of N/(1-H) clock pulses or a whole number multiple thereof where H equals the ratio of said first clock rate to said second faster clock rate.

18. In a controlled access memory for providing access to data blocks in response to a presented tag word, a directory unit comprising:
  a plurality of input-ouput circuit means;
  register means for presenting said input-output circuit means a succession of directory words comprising a tag syllable and an address syllable, said register means comprising a plurality of N bit charge storage shift registers arranged to shift circularly and in parallel, each said register storing a particular bit position of each said successive directory word and each said shift register being associated with a respective one of each of said input-output circuit means;
  means for clocking said shift register;
  means for storing said presented tag word;
  logic means for comparing each stored bit of said presented tag word to the corresponding tag syllable bit presented at the said input-output circuit means of each of said shift register storing said tag syllable bits as said shift registers are clocked by said clocking means, said comparisons occurring to detect a match between said presented tag word and one of said directory words; and
  means for outputting said address syllable only when a match is detected by said logic means.

19. The directory unit of claim 18 further including means for selectively masking said tag bits; and wherein said clock means including means for clocking at high speed rate with high speed clock pulses only those shift registers containing tag bits which are not masked while clocking the masked tag bit registers at a slow speed rate with slow speed clock pulses.

20. The directory unit of claim 19 further including means for automatically synchronizing said high speed clocked tag bit storing shift registers with said slow clocked tag bit storing shift registers.

21. The directory unit of claim 20 wherein said synchronizing means comprises:
  counter means for counting said high speed clock pulses; and
  means for disabling said high speed clocking and substituting said slow clock pulses therefor upon the count of said counter means reaching N/(1-H) or any whole number multiple thereof, where H equals the ratio of said slow speed rate to said high speed rate.

22. The directory unit of claim 18 further including means for writing a said presented tag word from said storing means into said tag bit storing shift registers.

23. The directory unit of claim 22 wherein said tag word writing means comprises:
  a use bit register for indicating the presence of a tag syllable in a particular directory word;
  means for generating an error signal and inhibiting said outputting of said address syllable if a match is detected by said logic means between said presented tag word and a tag syllable already stored in said directory unit,
  means for transferring said presented tag word from said storing means through said input-output means and into said tag bit storing registers during clocking of said directory word shift registers by said clocking means only when the absence of a use bit is detected; and
  wherein said clock means includes means for clocking said directory word storing shift registers with high speed clock pulses if no error signal is generated by said error generating means.

24. In a content addressable memory having a directory unit comprising a plurality of N-bit circulating address bit shift registers, a plurality of N-bit circulating tag bit shift registers and an equal plurality of mask register bits for selectively masking said tag bit shift registers, clocking circuitry for driving said address and tag bit registers comprising:
  means for producing fast clock and slow clock pulses;
  means for producing a control signal level and capable of being reset to produce a second level;
  means for clocking each said tag bit shift register which is not masked at high speed rate when said first control level is present and for driving each of said tag bit registers which is masked at slow speed rate when said first control level is present;
  means for driving said plurality of address bit shift registers with said fast clock pulses when said first control level is produced;
  means for driving said address bit and said tag bit registers at said slow clock speed when said second level is produced; and
  means for counting said fast clock pulses used to clock said address bit and unmasked tag bit registers and for resetting said signal level producing means upon said count reaching IN/(1-H) where H equals the ratio of said slow clock rate to said high clock rate and where I equals any whole number (1, 2, 3, ... I).

* * * * *

UNITED STATES PATENT AND TRADEMARK OFFICE
CERTIFICATE OF CORRECTION

PATENT NO. : 3,997,882
DATED : December 14, 1976
INVENTOR(S) : Deepak K. Goyal

It is certified that error appears in the above—identified patent and that said Letters Patent are hereby corrected as shown below:

Col. 2, line 3    "tack" should be --track--;

Col. 4, line 29    "hardward" should be --hardware--;

line 33    "is" should be --in--;

line 61    "$\overline{s}$" should be --s--;

line 63    "s" should be --$\overline{s}$--;

Col. 6, line 53    "t1" should be --$t_1$--;

Col. 8, line 67    after "AND gate" insert --103--;

Col. 9, line 49    "duces" should be --duced--;

Col. 15, line 30    "ouput" should be --output--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*